(12) United States Patent
Walthert

(10) Patent No.: US 10,794,659 B2
(45) Date of Patent: Oct. 6, 2020

(54) BOWFISHING ARROW SLIDE

(71) Applicant: Crosman Corporation, Bloomfield, NY (US)

(72) Inventor: Hans J. Walthert, Rush, NY (US)

(73) Assignee: Crosman Corporation, Bloomfield, NY (US)

( * ) Notice: Subject to any disclaimer, the term of this patent is extended or adjusted under 35 U.S.C. 154(b) by 0 days.

(21) Appl. No.: 16/181,710

(22) Filed: Nov. 6, 2018

(65) Prior Publication Data

US 2019/0186866 A1 Jun. 20, 2019

Related U.S. Application Data

(60) Provisional application No. 62/582,275, filed on Nov. 6, 2017.

(51) Int. Cl.
| | |
|---|---|
| *F42B 6/04* | (2006.01) |
| *F41B 5/14* | (2006.01) |
| *A01K 81/04* | (2006.01) |
| *F42B 6/02* | (2006.01) |

(52) U.S. Cl.
CPC ............ *F41B 5/1488* (2013.01); *A01K 81/04* (2013.01); *F42B 6/02* (2013.01); *F42B 6/04* (2013.01)

(58) Field of Classification Search
CPC .................................. F41B 6/04; F15D 1/025
See application file for complete search history.

(56) References Cited

U.S. PATENT DOCUMENTS

| | | | | |
|---|---|---|---|---|
| 333,789 | A * | 1/1886 | Spear | |
| 772,279 | A * | 10/1904 | Grouvelle et al. | |
| 1,238,672 | A * | 8/1917 | Hopwood | B05B 7/0081 239/72 |
| 6,517,453 | B2 * | 2/2003 | LaSee | F42B 6/04 124/86 |
| 9,109,852 | B1 * | 8/2015 | Boester | F41B 5/1488 |
| 2017/0292820 | A1 | 10/2017 | Brown | |

* cited by examiner

*Primary Examiner* — John A Ricci
(74) *Attorney, Agent, or Firm* — Lee & Hayes, P.C.

(57) ABSTRACT

In aspects of the invention, an arrow slide is provided with a body having a first opening with a plurality of first edges arranged in a generally triangular configuration within which a first diameter can be received, a second opening with a plurality of second edges arranged in the generally triangular configuration within which the first diameter can be received; sidewalls linking corresponding ones of the first plurality of edges to the plurality of second edges to create a passageway extending from the first opening to the second opening through which an arrow can slide; and a string mount to which a bowfishing line can be joined.

20 Claims, 14 Drawing Sheets

BOWFISHING ARROW SLIDE

CROSS-REFERENCE TO RELATED APPLICATIONS

This application claims priority to U.S. Patent Application 62/582,275, filed Nov. 6, 2017, the entire disclosure of which is incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to bowfishing arrows and more particularly to slides linking the bowfishing arrow to a retraction line.

Description of Related Art

Bowfishing is a method of fishing that uses a bow and arrow to fish. In general an arrow having a barbed tip is shot into a fish. The arrow has a line joined to it that allows the fisher to pull in the fish.

It will be appreciated that tethering an arrow to a line creates potential challenges in that such a line should be positioned so that it does not interfere with the operation of the bow or interfere with the trajectory of the arrow in flight. There have been a number of attempts address these difficulties.

In one example, shown and described in U.S. Pat. No. 6,517,453, entitled Bowfishing Arrow Attachment, issued to LaSee on Feb. 11, 2003 an improved bowfishing arrow is shown that is said to prevent the bowfishing line from tangling with the bow string during release which can cause the arrow to snap back to cause serious injury. The improved arrow is said to achieve this prevention by including a cylindrical slide and a stop on the arrow shaft. The bowfishing line is tied to the slide which stays in front of the archer's hand and the arrow rest during drawback. After arrow release, the slide slides back to the stop, which is located close to the rearward end of the arrow. The stop is designed to not touch the arrow rest or the bow handle during release. Because the slide slides back to the rearward end of the arrow during release, the rubbing of the fishing line against the arrow shaft and thus the wear of the fishing line is said to be greatly reduced. The stop itself has a dampening material against which the slide can be advanced.

In embodiments, the slide has internal grooves formed in its interior surface. These grooves are formed so that grains of sand do not wedge between the slide and the arrow shaft. The slide further has lateral projections that serve as vanes. The vanes provide directional stability for the arrow both in air and water, much like the feather or fletchings attached to arrows not intended for bowfishing. In embodiments the line is tied to the slide on opposite sides of the arrow.

Another example is shown and described in U.S. Pat. No. 9,109,852, entitled Bowfishing Arrow Slide With Overmolded Dampening Member Arrangement issued to Boester on Aug. 18, 2015. This patent includes a slide having a slide body configured to slide along an arrow shaft. The arrangement further includes a stop used in cooperation with the slide. The stop is arrangeable on the arrow shaft in a manner to prevent the slide from sliding off of the arrow shaft. A dampening material is secured to the rear of the slide and arranged between the slide and the stop.

A further example is shown and described in US. Pub. No. 2017/0292820, entitled Bowfishing Shaft Adapter. In this publication a bowfishing slide and a circumferential stop assembly are shown for use with a bowfishing arrow that may include matching shapes for engaging one another in use. The engagement of such matching shapes is said to offer many improvements over conventional slide and stop assemblies, including an even circumferential distribution of impact between the slide and the stop as well as inhibiting relative longitudinal or rotational movement between the slide and stop assemblies. The stop assembly may further include a nock adapter for engaging a nock, thereby serving as a dual purpose adapter. For ease of use and installation, the stop assembly may be adapted to fit snugly over an arrow shaft.

These various approaches however can interfere with the trajectory of the arrow during flight. In particular, it will be appreciated that arrow slides that are cylindrically fitted configurations engage the arrow along a significant length and that any contaminants must pass through the entire length without interference. Even where the slide is grooved to allow contaminant flow through such channels, unimpeded travel through the groove is not ensured creating a risk that a slide will react to a contaminant in ways that exert unintended torque or other forces on the arrow that negatively influence arrow trajectory or orientation.

Additionally, string or line attachment can be challenging. It is preferred to attach a string in such a way that distributes stress over a larger area to balance load on a string loop itself and on the slide. Doing this can help to reduce premature failure of lines or slides.

Therefore, a need exists for an improved arrow slide for use in bowfishing that can avoid these difficulties while being ready for low cost reliable manufacturing and still providing user friendly assembly and reliable function to an arrow and a bowfishing line.

BRIEF DESCRIPTION OF THE SEVERAL VIEWS OF THE DRAWING(S)

SUMMARY OF THE INVENTION

In aspects of the invention, an arrow slide is provided with a body having a first opening with a plurality of first edges arranged in a generally triangular configuration within which a first diameter can be received, a second opening with a plurality of second edges arranged in the generally triangular configuration within which the first diameter can be received; sidewalls linking corresponding ones of the first plurality of edges to the plurality of second edges to create a passageway extending from the first opening to the second opening through which an arrow can slide; and a string mount to which a bowfishing line can be joined.

DETAILED DESCRIPTION OF THE INVENTION

Figure 1:
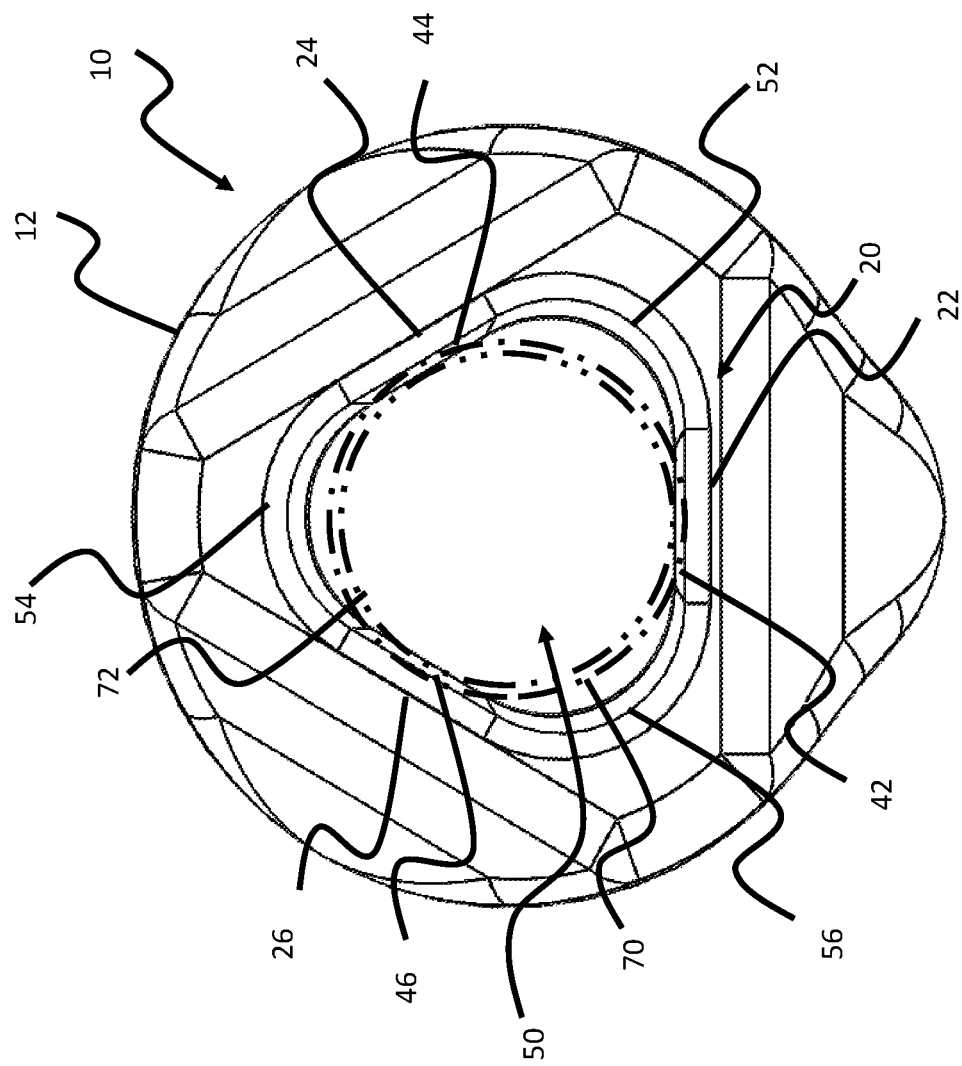
FIG. 1 shows a front elevation view of one embodiment of an arrow slide.
Figure 2:
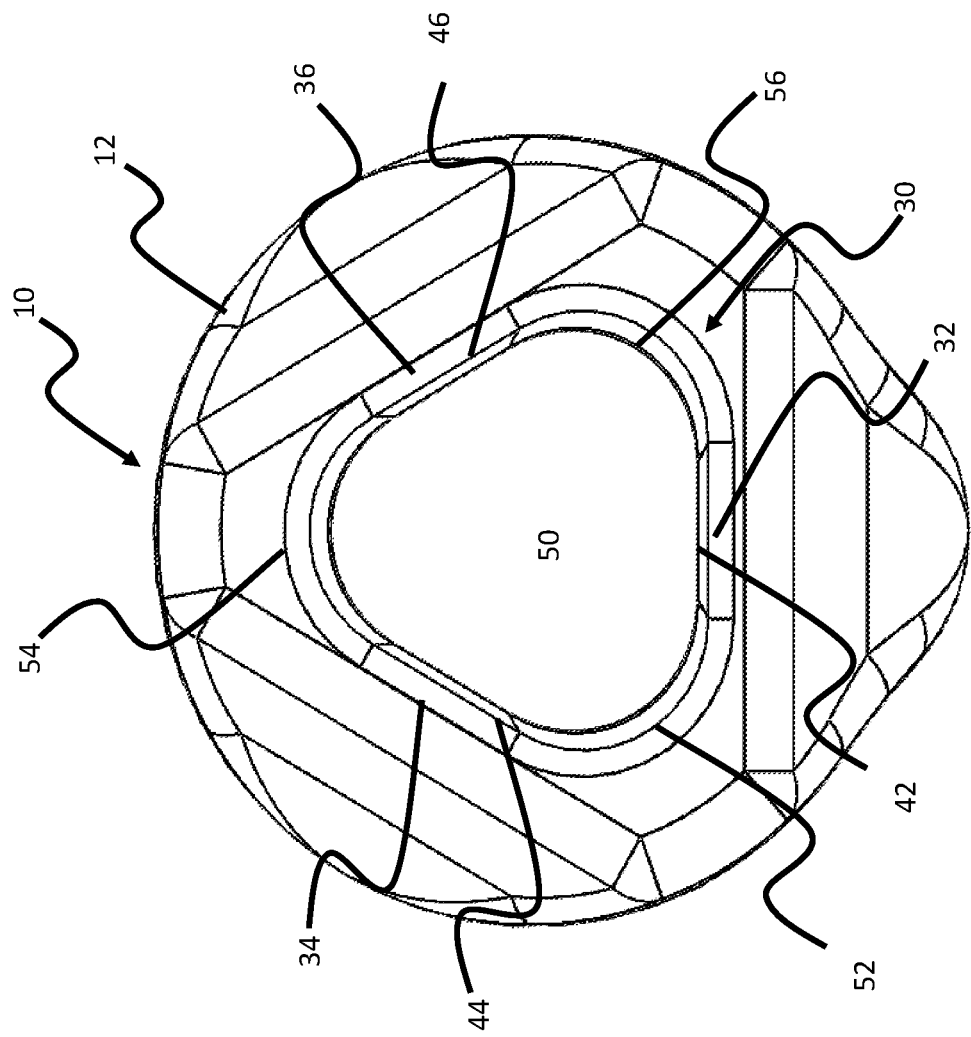
FIG. 2 shows a rear elevation view of the embodiment of FIG. 1.
Figure 3:
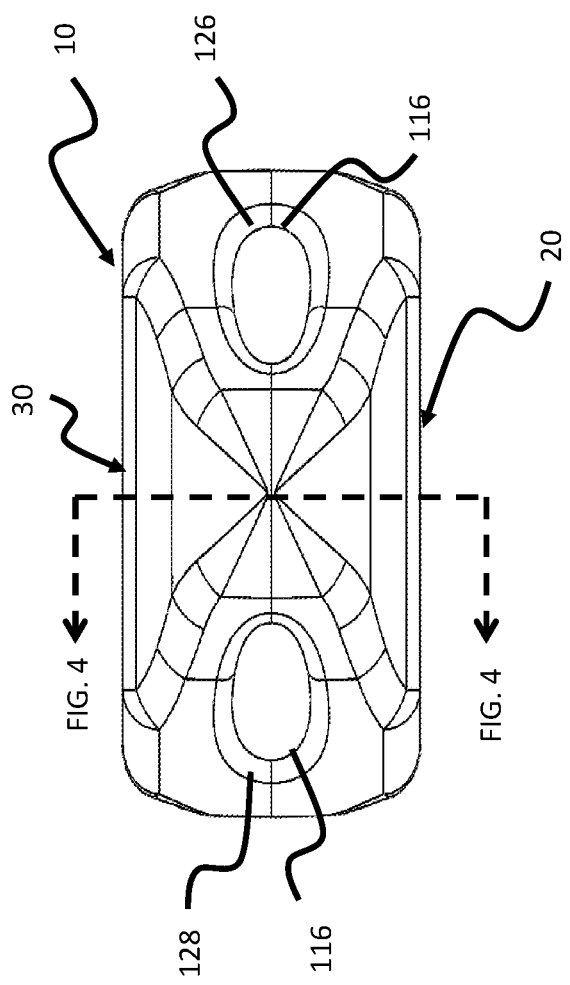
FIG. 3 shows a top elevation view of the embodiment of FIG. 1.
Figure 5:
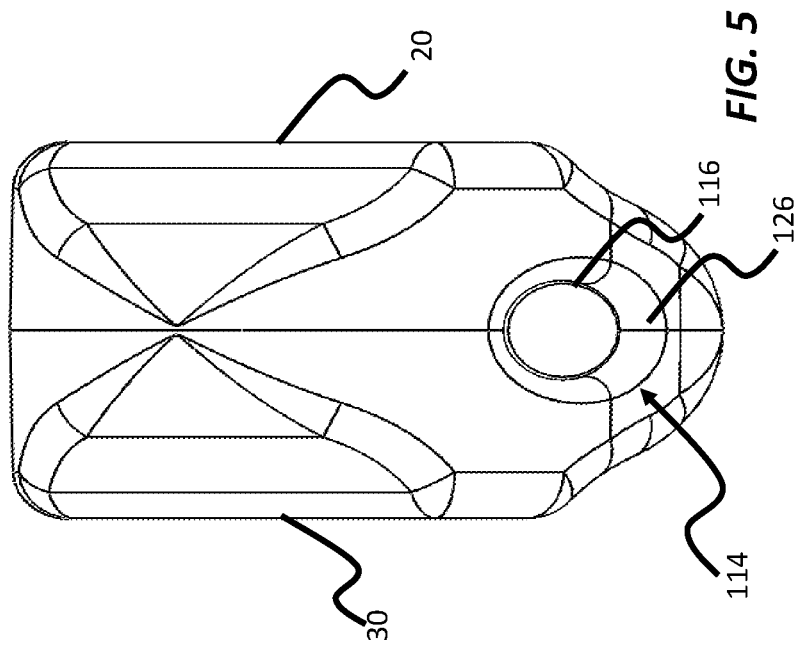
FIG. 5 shows a side elevation view of the embodiment of FIG. 1.
Figure 4:
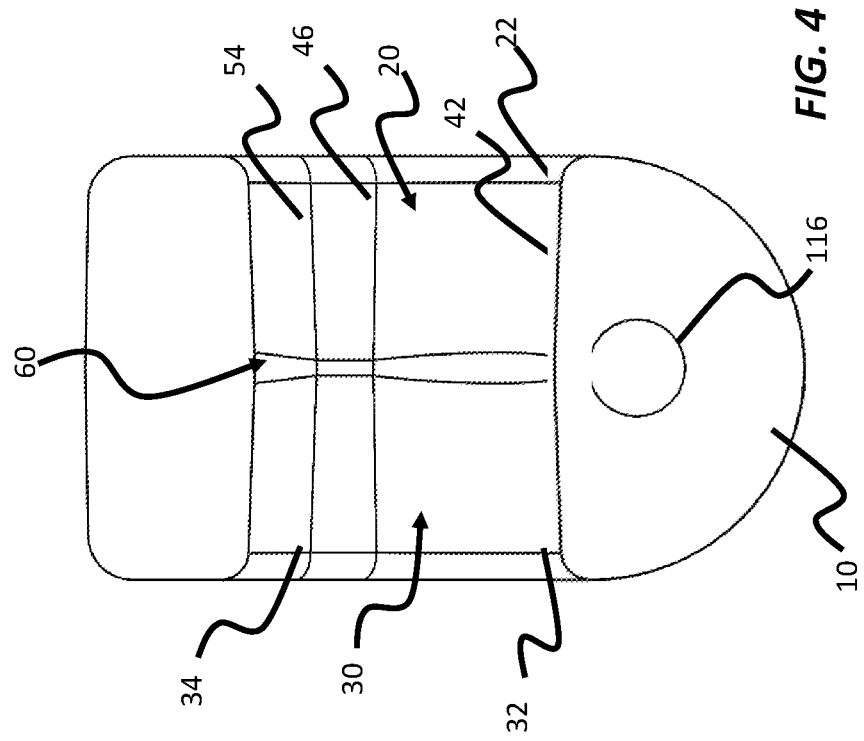
FIG. 4 shows a side section view of the embodiment of FIG. 1 taken as shown in FIG. 3
Figure 6:
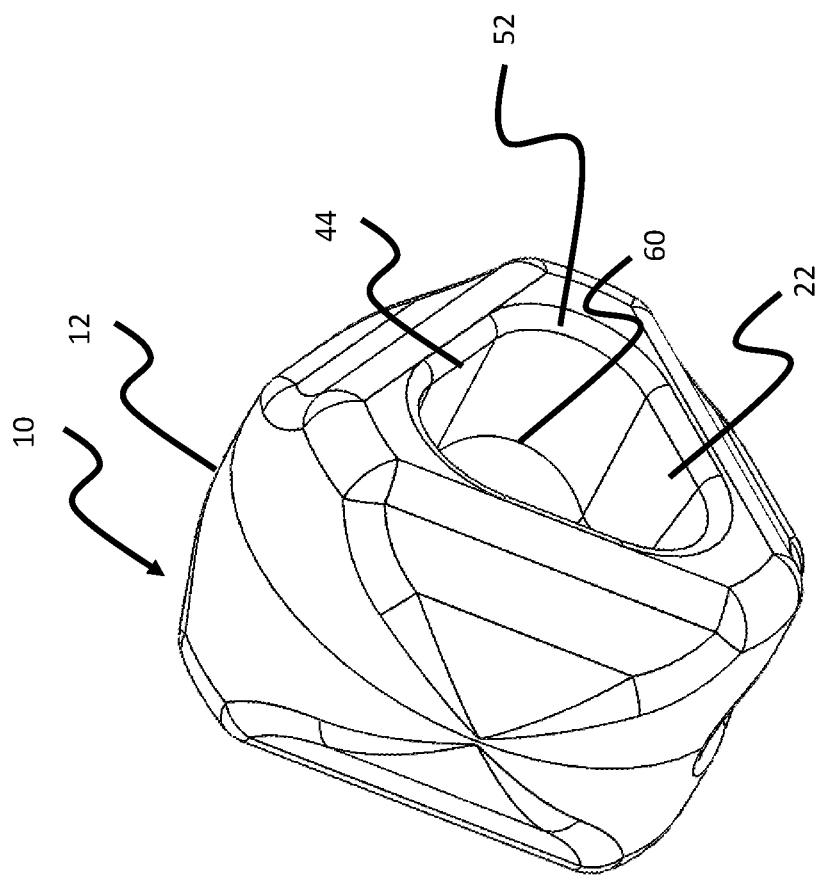
FIG. 6 is a front, top, left side view of the embodiment of FIG. 1.

FIG. 1 shows a front view of one embodiment of an arrow slide 10 while FIG. 2 shows a rear view of the embodiment of FIG. 1. FIG. 3 shows a bottom view of the embodiment of FIG. 1, FIG. 4 shows a side section view of the embodiment of FIG. 1 taken as shown in FIG. 3 and FIG. 5 shows a side view. FIG. 6 is a front, top, left side view of the embodiment of FIG. 1.

As is shown in FIGS. 1-6 arrow slide 10 has a slide body 12 with a first opening 20. First opening 20 has a first plurality of generally edges 22, 24, and 26 arranged in a generally polygonal configuration. A second opening 30 has a second plurality of generally configured edges 32, 34 and 36 arranged in a generally polygonal configuration.

A plurality of sidewalls 42, 44 and 46 link corresponding ones of the first plurality of edges 22, 24 and 26 with second plurality of edges 32,34, and 36. In the embodiment that is illustrated, sidewall 42 links edges 22 and 32, sidewall 44 links edges 24 and 34 and sidewall 46 links edges 26 and 36 to create a passageway 50 extending from first opening 20 to second opening 30 through which an arrow (not shown in FIGS. 1-5) can slide.

In embodiments, sidewalls 42, 44 and 46 may extend laterally in a generally planar fashion until sidewalls 42, 44 and 46 intersect. In the embodiment illustrated sidewalls 42 and 44 are linked by a first corner 52, sidewalls 44 and 46 are linked by a second corner 54 and sidewalls 46 and 42 are linked by a third corner 56. The use of corners 52, 54, and 56 helps to reduce the overall diameter of slide 10 and further helps to provide additional stability at each corner.

In the embodiment shown in FIGS. 1-6, corners 52, 54 and 56 are not configured to make contact with an arrow inserted into slide 10. Accordingly, the diameter of a cylindrical object that can pass through slide 10 is determined based upon sidewalls 42, 44, and 46.

Edges 22, 24 and 26 of first opening 20 and edges 32, 34 and 36 of second opening 30 are defined to admit a cylindrical object having a first diameter 70. However, sidewalls 42, 44 and 46 are sloped to form a waist portion 60 between first opening 20 and second opening 30 having a second diameter 72 that allows relative sliding movement of an arrow and slide 10 but has a smaller diameter than first diameter 70.

Waist 60 therefore comprises at least one point of primary contact between slide 10 and any arrow inserted through slide 10. It will be appreciated that waist 60 maintains this contact only within a limited range of longitudinal positions proximate to waist 60 and that such contact is generally limited both longitudinally by the slope of sidewalls and any shaping of the sidewalls at waist 60.

Figure 7:
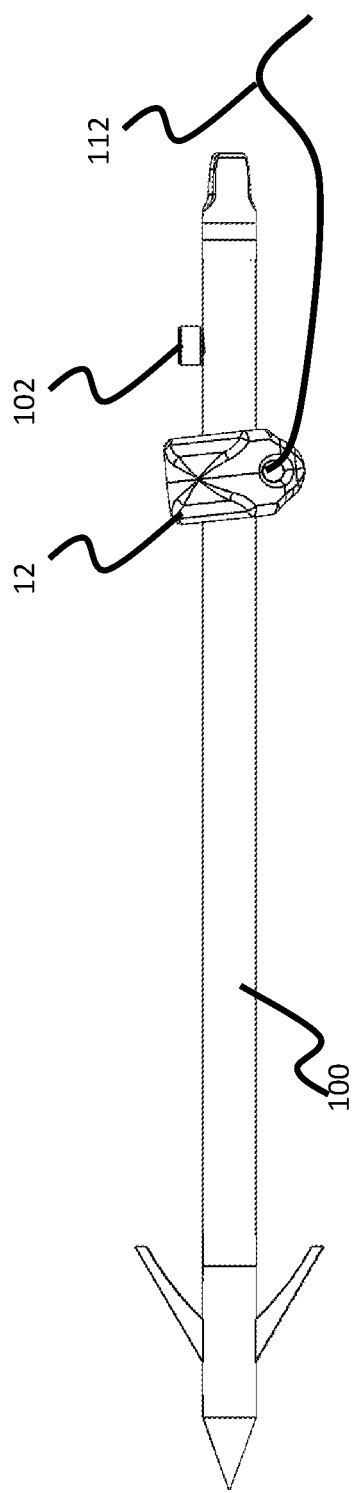
FIG. 7 is a side elevation view of the embodiment of FIG. 1 mounted to an arrow.

FIG. 7 is a side elevation view of a slide 10 mounted to an arrow 100. It will be understood that by virtue of this arrangement a slide 10 positioned on an arrow 100 will have a degree of pivotal movement available before slide 10 and an associated line 112 asserts any force meaningful force against arrow 100 during flight. This can dampen minor forces exerted on slide 10 by line 112.

Additionally, it will be appreciated that using slide 10, the amount of torque that can be applied to arrow 100 is limited by the reduced extent of the longitudinal engagement between slide 10 and arrow 100. This is particularly advantageous when compared to other approaches that use cylindrical mountings that extend for several centimeters along the axis of an arrow and therefore can convey significantly more torque to arrow 100.

The amount of torque that can be applied to arrow 100 by slide 10 is further reduced by the limited extent of friction between slide 10 and arrow 100. That is, the limited extent of surface area in contact between slide 10 and arrow 100 limits the frictional forces between slide 10 and arrow 100.

It will be appreciated that in the embodiment illustrated here, sidewalls 42, 44 and 46 are arranged such that they confront arrow 100 with non-concentric surfaces. Accordingly, these sidewalls generally engage arrow 100 at points that are tangential to the curved radius of the exterior surface of arrow 100. This limits the extent to which sidewalls 42, 44 and 46 engage arrow 100 along a lateral axis further reducing friction.

Figure 8:
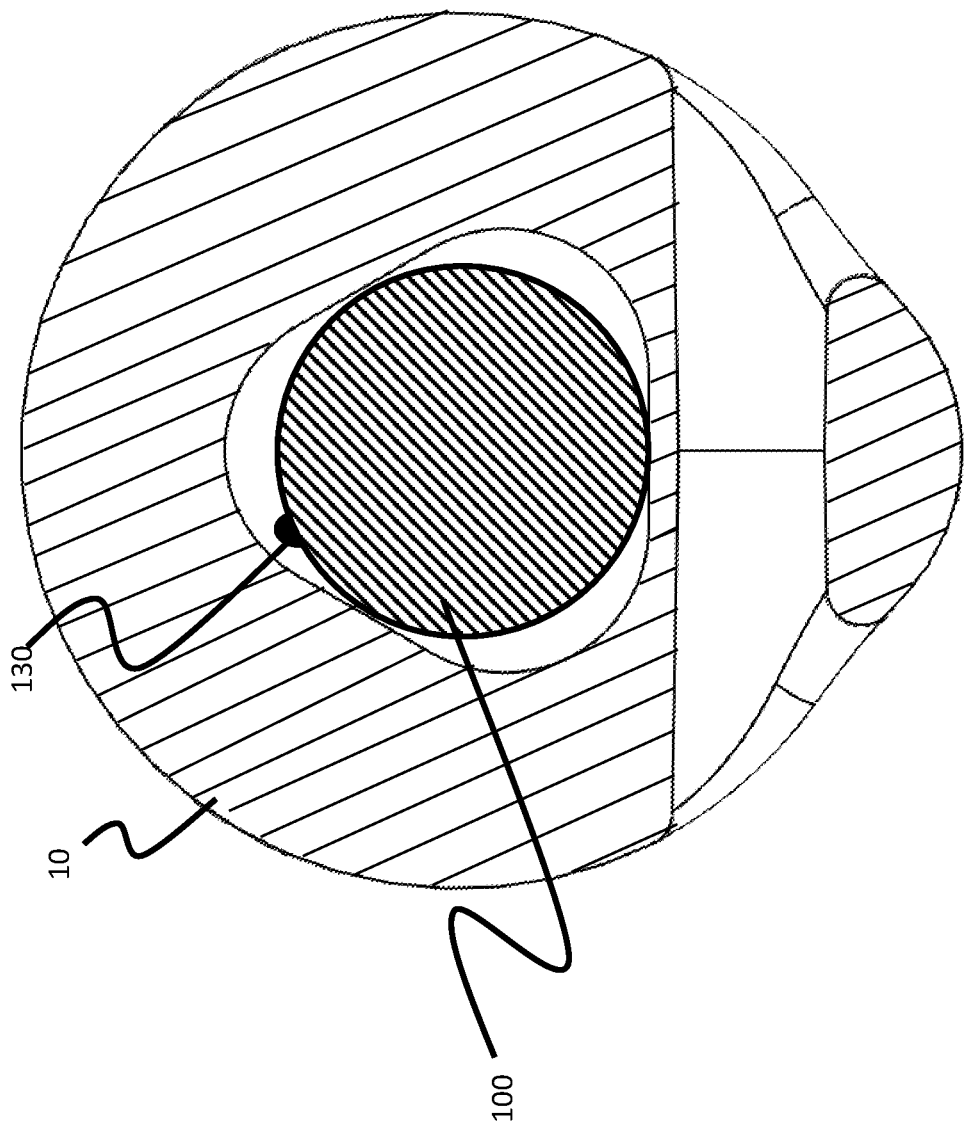
FIG. 8 is a section view of a slide and an arrow with contaminant on the arrow.

FIG. 8 is a section view of a slide 10 and an arrow 100 with contaminant 130 on the arrow. As is shown in FIG. 8, in this embodiment there are substantially smaller opportunities to allow contamination on arrow 100 to get between slide 10 and arrow 100 in places of narrow clearance. As is shown here the generally tangential nature of the engagement between sidewalls 42, 44, and 46 significantly limits the number of positions about the perimeter of an arrow 100 along which such a contaminant 130 might be positioned where contaminant 130 may interfere with the movement of slide 10. Additionally, corner portions 52, 54, and 56 provide significant areas in which large contaminants may be bypassed or diverted to allow smooth motion. This may also reduce the risks that contaminant 130 will degrade arrow 100 or slide 10.

Such corner portions also allow air and water to flow between slide 10 and arrow 100 during flight of the arrow to limit air or water resistance caused by slide 10.

Also shown in the embodiment of FIGS. 1-8, slide 10 has a body 12 that also incorporates a line mounting 114 comprising a passageway 116 formed on one side of arrow 100. Passageway 116 has radiused corners 126 and 128 which provide a protected area within which forces can be applied against line 112 over a broader area to help protect line 112 from damage.

Figure 9:
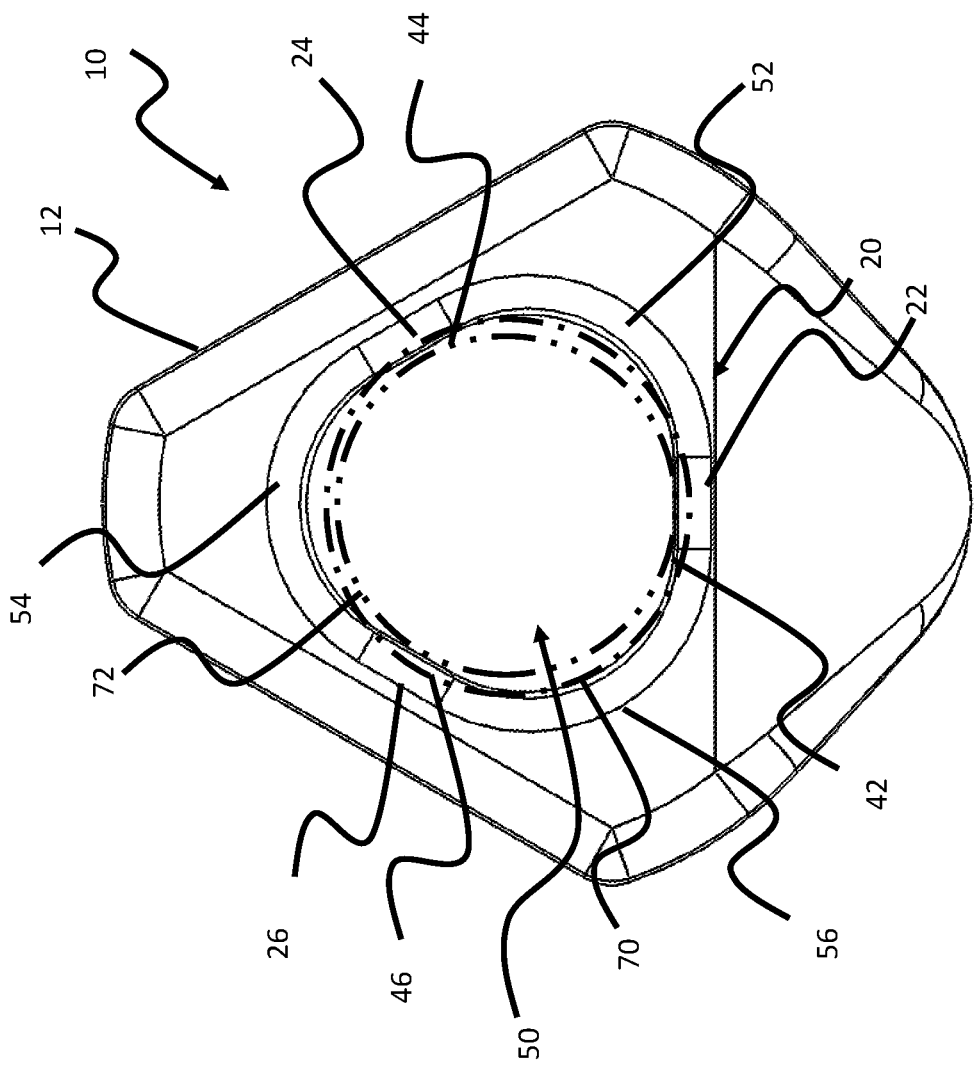
FIG. 9 shows a front elevation view of another embodiment of an arrow slide.
Figure 10:
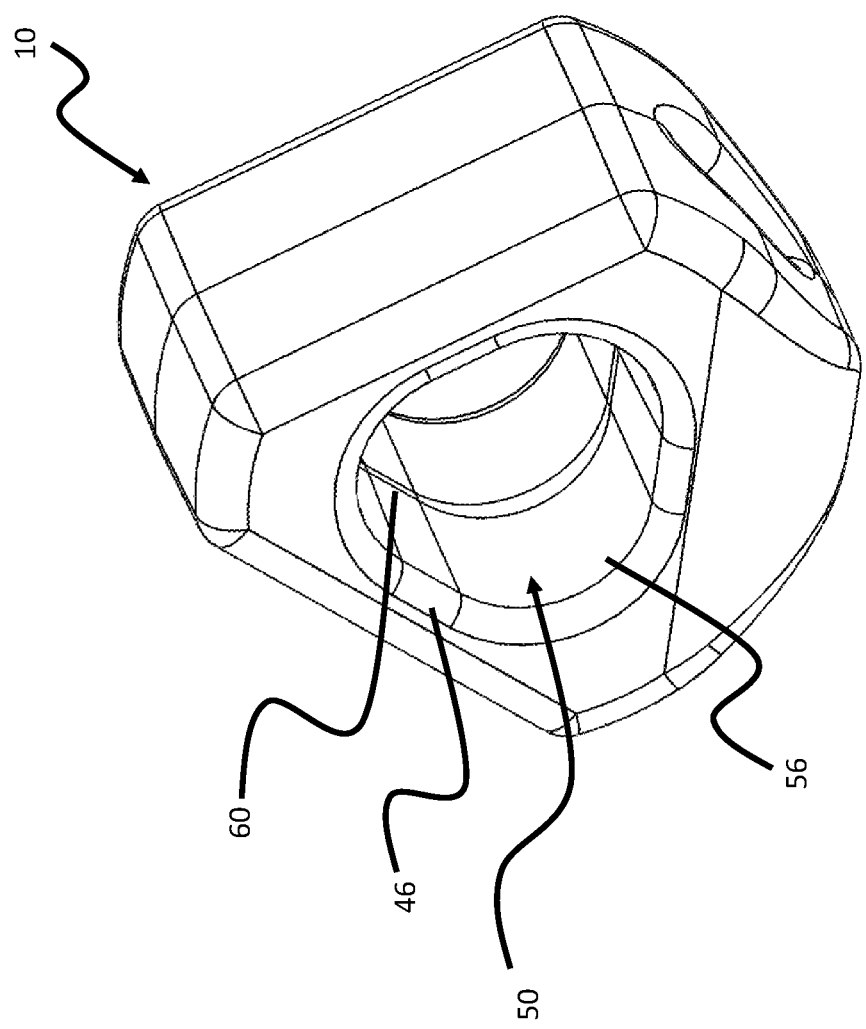
FIG. 10 shows a rear, left side, top perspective view of the embodiment of FIG. 9.
Figure 11:
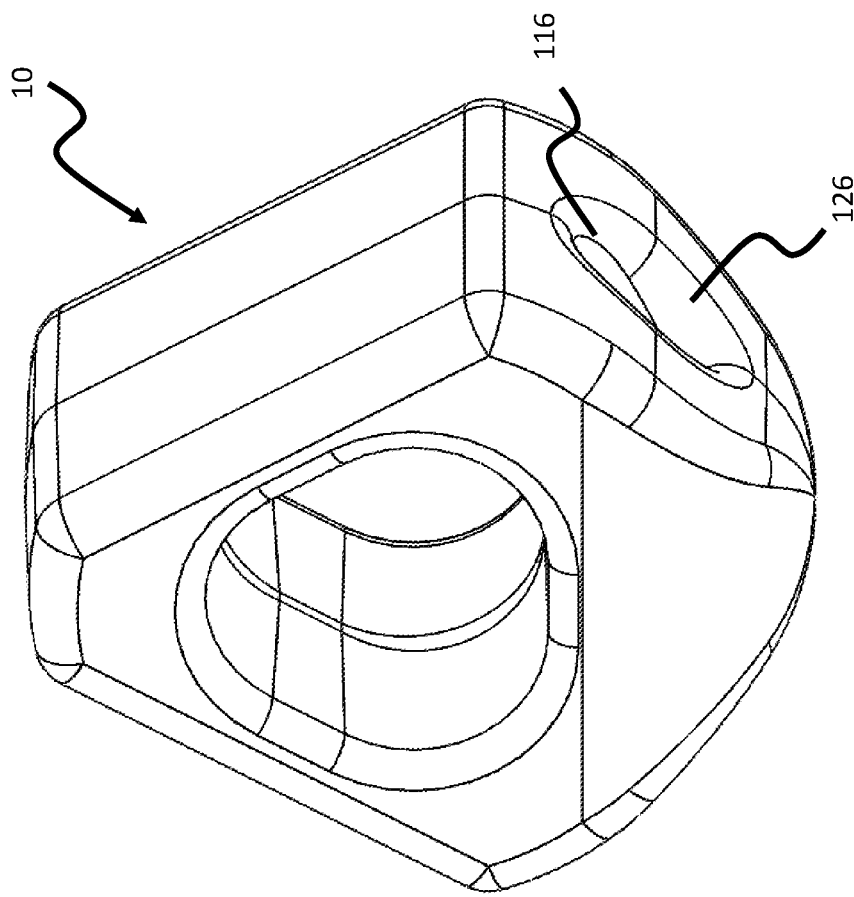
FIG. 11 shows a front, left right side elevation of the embodiment of FIG. 9.
Figure 12:
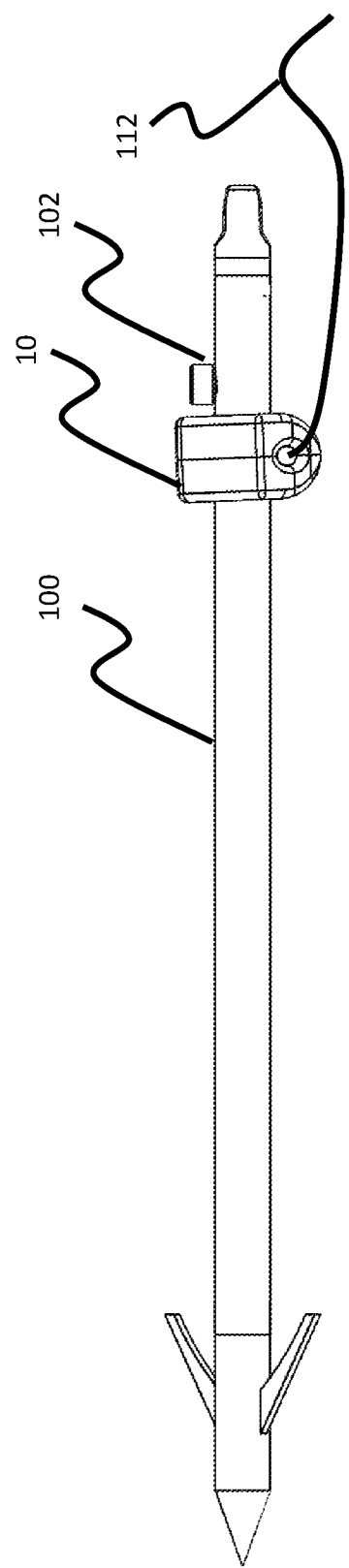
FIG. 12 shows a left side elevation view of the embodiment of FIG. 9 mounted to an arrow having a stop.
Figure 13:
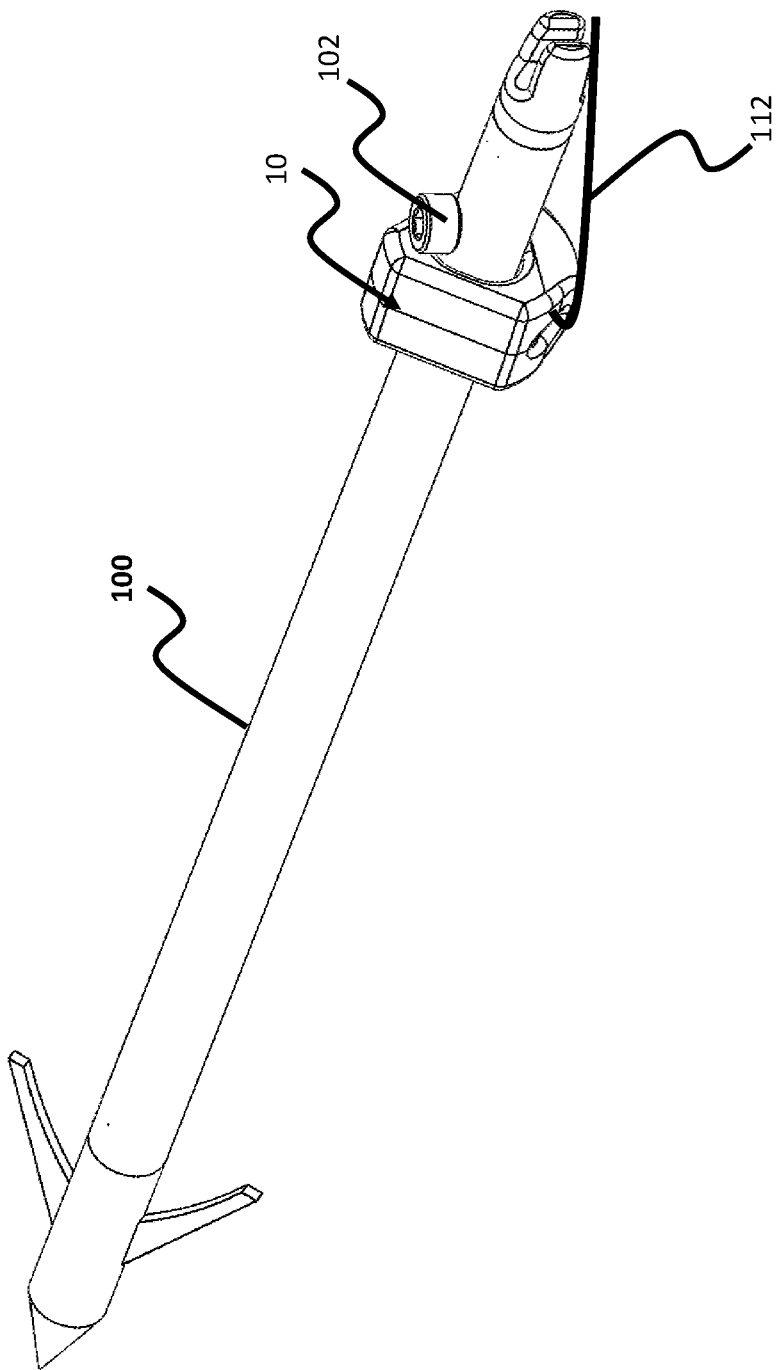
FIG. 13 shows a back, left, top perspective view of the embodiment of FIG. 9 mounted to an arrow having a stop.
Figure 14:
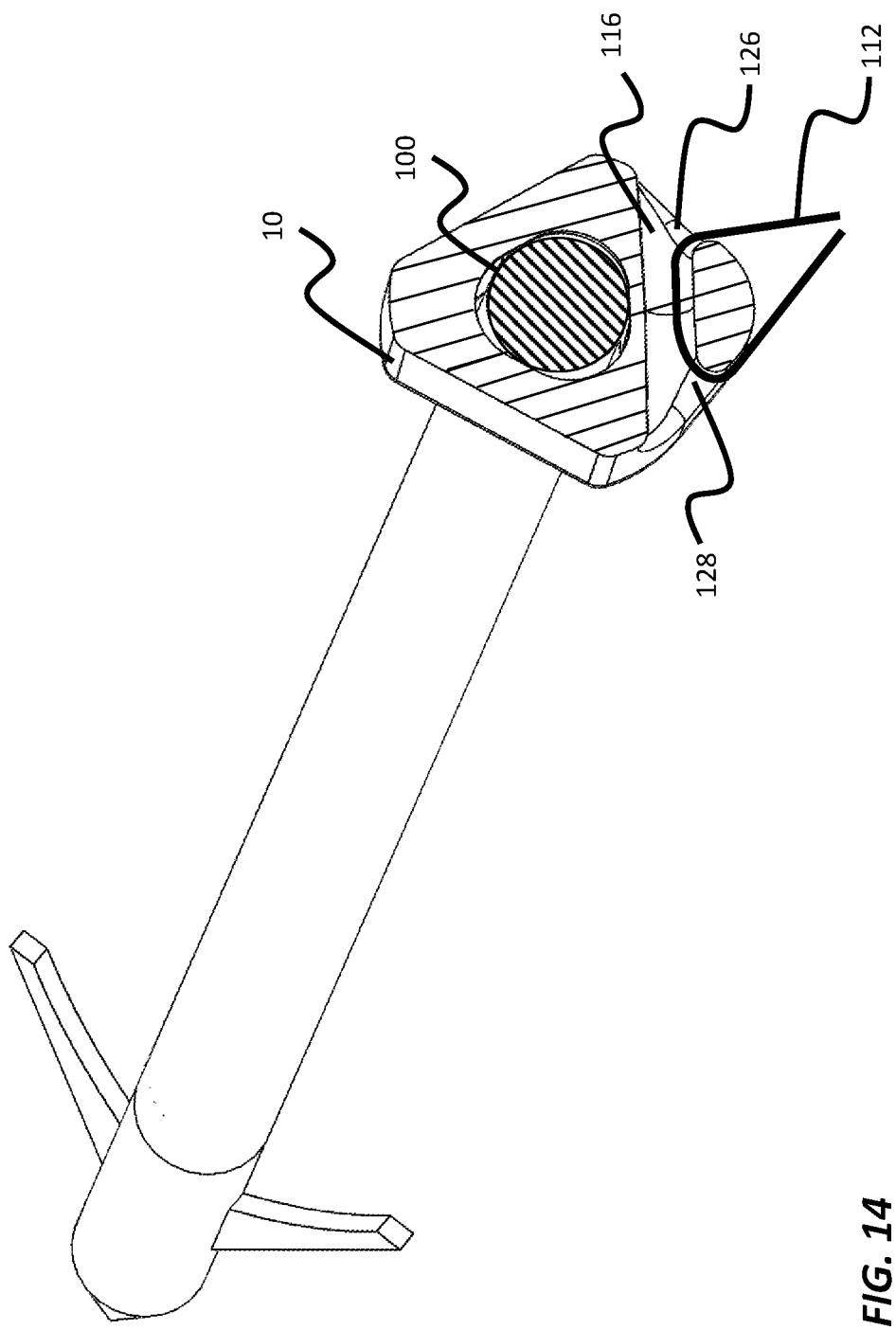
FIG. 14 shows a back, left, top perspective view of the embodiment of FIG. 9 mounted to an arrow and sectioned.
Figure 15:
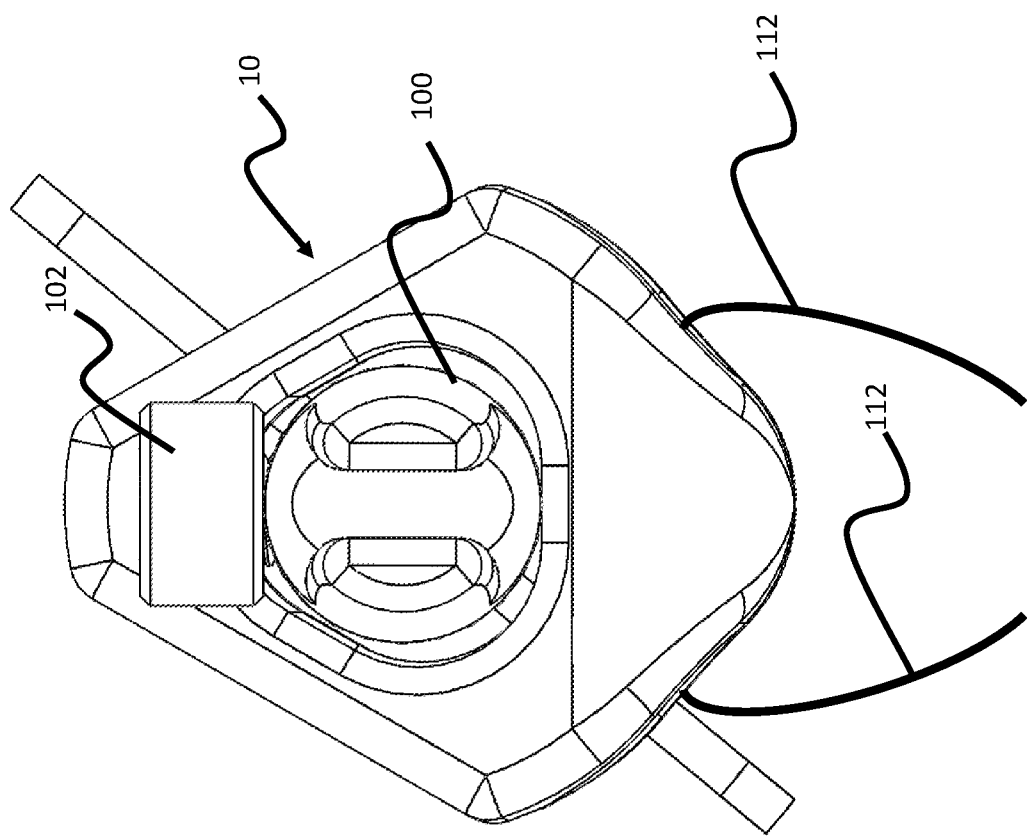
FIG. 15 illustrates an end view of the embodiment of FIG. 9 mounted to an arrow.

FIGS. 9-15 illustrate another embodiment of a slide 10 having a lighter weight and different form factor while still providing a slide body 10, a first opening 20, a second opening 30, sidewalls 42, 44 and 46, corners 52, 54 and 56 and a waist 60 that can provide, in embodiments, one or more advantages and benefits described above. FIG. 9 shows a front elevation view of this embodiment of an arrow slide, FIG. 10 shows a rear, left side, top perspective view of the embodiment of FIG. 9, FIG. 11 shows a front, left right side elevation of the embodiment of FIG. 9, FIG. 12 shows a left side elevation view of the embodiment of FIG. 9 mounted to an arrow having a stop. FIG. 13 shows a back, left, top perspective view of the embodiment of FIG. 9 mounted to an arrow having a stop. FIG. 14 shows a back, left, top perspective view of the embodiment of FIG. 9 mounted to an arrow and sectioned and FIG. 15 illustrates an end view of the embodiment of FIG. 9 mounted to an arrow.

As can be seen in FIGS. 9-15, this embodiment, corners 52, 54 and 56 are shown configured to provide additional structural support for managing impact forces associated with contacting a stop 102.

FIGS. 12-15 illustrate the embodiment of FIG. 9 mounted to an arrow having a stop 102. A portion of line 112 is also shown. FIG. 14 illustrates the embodiment of FIG. 9 mounted to an arrow and sectioned showing passageway 50 and passageway 116. FIG. 15 illustrates an end view of the embodiment of FIG. 9 mounted to an arrow.

It will be appreciated that in either of the embodiments of FIGS. 1-8 and FIGS. 9-16, the limited surface area of arrow slide 10 in contact with arrow 100 at waist 60 imposes a constraint on the extent of frictional forces that can arise at waist 60 when arrow slide 10 is moved relative to arrow 100 and that this constraint can enable the use of materials or processes in forming arrow slide 10 that are unavailable with designs involving more significant surface area in contact between arrow slide 10 and arrow 100.

For example, in embodiments, body 20 can be fabricated or otherwise provided using a material that has a high tear resistance such as a hard plastic material having limited elongation or an elastomer material that is softer but is capable of greater resiliency.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A slide configured to couple to an arrow, the slide comprising:
a body having:
a first opening defined at least in part by a plurality of first edges arranged in a generally triangular configuration, the plurality of first edges being joined by first corners, the first opening sized to receive a first diameter;
a second opening defined at least in part by a plurality of second edges arranged in a generally triangular configuration, the plurality of second edges being joined by second corners, the second opening sized to receive the first diameter;
sidewalls linking corresponding ones of the plurality of first edges to the plurality of second edges to create a passageway extending from the first opening to the second opening through which at least a portion of the arrow can slide, wherein the sidewalls are sloped to form a waist portion between the first opening and the second opening, the waist portion having a second diameter that is smaller than the first diameter; and
a string mount configured to receive a bowfishing line.

2. The slide of claim 1, wherein the waist portion is configured to contact the arrow in the passageway along a range of longitudinal positions that is limited by a slope of the sidewalls at the waist portion.

3. The slide of claim 2, wherein an amount of torque applied to the arrow before pivotal movement of the slide is limited by the range of longitudinal positions.

4. The slide of claim 2, wherein an amount of torque applied by the slide to the arrow in the passageway is limited by an amount of friction between the waist portion in contact with the arrow along the range of longitudinal positions.

5. The slide of claim 1, wherein the slide has a degree of pivotal movement about the waist portion to dampen forces exerted on the slide when the bowfishing line couples to the string mount.

6. The slide of claim 1, wherein the sidewalls are configured to generally tangentially engage the arrow.

7. The slide of claim 1, wherein the sidewalls are joined by corners that are not configured to make contact with the arrow.

8. The slide of claim 1, wherein the body further comprises a second passageway through which the bowfishing line is configured to extend.

9. The slide of claim 8, wherein the second passageway has a radiused opening area within which forces applied against the bowfishing line protect the bowfishing line from damage.

10. An apparatus comprising:
a body including:
a first end; and
a second end;
a first opening disposed at the first end;
a second opening disposed at the second end;
a first passageway extending through the body between the first opening and the second opening, the first passageway including sidewalls joined by corners, wherein at least a portion of the sidewalls slope inwards from the first opening to the second opening, and the least the portion of the sidewalls are configured to engage a shaft of an arrow only at locations distant from the corners; and
a second passageway extending through the body.

11. The apparatus of claim 10, wherein the at least the portion of the sidewalls slope inward to form a waist portion that has a smaller cross-sectional dimension than a largest cross-sectional dimension of at least one of the first opening or the second opening.

12. The apparatus of claim 10, wherein at least one of:
the body comprises a generally triangular shape between the first end and the second end;
the first opening comprises a generally triangular shape; or
the second opening comprises a generally triangular shape.

13. The apparatus of claim 10, wherein:
the sidewalls comprise a first sidewall, a second sidewall adjoined to the first sidewall, and a third sidewall adjoined to the first sidewall and the second sidewall;
the second sidewall is disposed at an acute included angle relative to the first sidewall; and
the third sidewall is disposed at an acute included angle relative to the first sidewall.

14. The apparatus of claim 13, wherein the corners comprise a first corner, a second corner, and a third corner:

the first corner is disposed between the first sidewall and the second sidewall;

the second corner is disposed between the first sidewall and the third sidewall;

the third corner is disposed between the second sidewall and the third sidewall; and the first passageway is configured to receive and engage the shaft of the arrow at locations distant from the first corner, the second corner, and the third corner.

15. An apparatus for coupling an arrow to a bow, the apparatus comprising:

a body including:

a first end; and a second end;

a first opening disposed at the first end;

a second opening disposed at the second end;

a passageway disposed through the body between the first opening and the second opening, the passageway including:

a waist; and sidewalls adjoined at least in part by corners, wherein at least a portion of the sidewalls taper inwards from the first opening to the waist, and the sidewalls are configured to engage a shaft of an arrow only at locations distant from the corners of the passageway.

16. The apparatus of claim 15, wherein at least a portion of the sidewalls taper inwards from the second opening to the waist.

17. The apparatus of claim 15, further comprising an additional passageway disposed through the body.

18. The apparatus of claim 15, wherein at least one of:

a largest cross-sectional dimension of the first opening is greater than a largest cross-sectional dimension of the waist; or a largest cross-sectional dimension of the second opening is greater than the largest cross-sectional dimension of the waist.

19. The apparatus of claim 15, wherein:

the first opening and the second opening are sized to receive the shaft having a first diameter; and at least a portion of the waist has a second diameter that is smaller than the first diameter.

20. The apparatus of claim 15, wherein the waist has a degree of pivotal movement about the shaft of the arrow.

* * * * *